Figure 1:
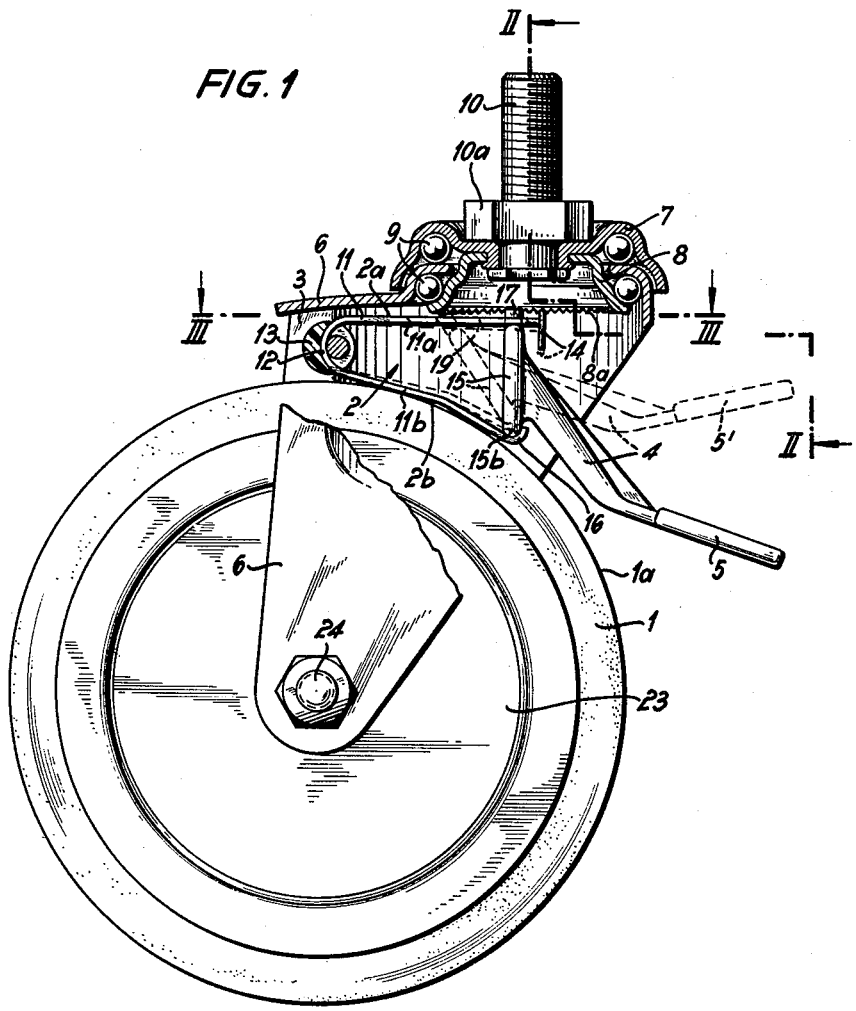

Dec. 29, 1964   G. MÖBUS   3,162,888
LOCK TYPE CASTER

Filed June 14, 1962   2 Sheets-Sheet 1

INVENTOR
GÜNTER MÖBUS
By Burgess, Dinklage & Sprung
ATTORNEYS

Dec. 29, 1964   G. MÖBUS   3,162,888
LOCK TYPE CASTER

Filed June 14, 1962   2 Sheets-Sheet 2

INVENTOR
GÜNTER MÖBUS
By Burgess, Dinklage & Sprung
ATTORNEYS

United States Patent Office 3,162,888
Patented Dec. 29, 1964

3,162,888
LOCK TYPE CASTER
Günter Möbus, Remscheid, Germany, assignor to Firm Tente-Rollen Gesellschaft mit beschränkter Haftung & Companie, Tente, Rhineland, Germany, a company of Germany
Filed June 14, 1962, Ser. No. 202,443
Claims priority, application Germany, Sept. 28, 1961, T 20,850
8 Claims. (Cl. 16—35)

This invention relates to a caster comprising a locking device for locking the pivoting and rotary movement of the wheel, said caster being of use more particularly for furniture for hospitals and doctors, for example patients' beds and equipment cabinets.

Casters comprising locking devices for locking the fork and the wheel are known in various types of construction. As a rule, a pawl mounted pivotally in the caster fork cavity is provided to lock the pivoting and rotary movement of the wheel and can be pressed against the wheel to obstruct its rotary movement and on the other hand can be engaged with teeth on the caster holder to check the pivoting of the caster fork and the wheel mounted therein. For this purpose, in the case of casters which are locked by an eccentric or wedge through the agency of a suitable operating mechanism, the caster holder may comprise a locking pin which, for example, passes through the caster fastening pin and which has teeth at its bottom end and which can be brought into engagement with the pawl mounted pivotally in the fork, which pawl for this purpose generally has a corresponding matching toothing, as is well known. If single locking of the casters is sufficient, they are usually equipped with a locking lever which can be tensioned and released with the toe.

The invention relates to a caster of this kind comprising a locking device for locking the pivoting and rotary movement of the wheel, wherein in known manner a pawl mounted pivotally in the wheel fork cavity can on the one hand be pressed against the wheel and on the other hand be brought into engagement with teeth on the caster holder and thus lock the caster.

Known constructions have various disadvantages. In particular, they are mechanically too complicated, and the expense is out of all proportion to the actual caster. Locking of the wheel to the rotatable part of the fork by means of toggle levers, shift levers, or wedges in the form of guard plates require a very large number of individual parts, which makes the caster very much more expensive. Moreover, the locking mechanism has to be repeatedly adjusted as wear increases, particularly on the wheel, and this adjustment can only rarely be carried out by the layman without the use of skilled labour.

The invention relates to a caster which is of very simple construction in respect of the locking of the pivoting and rotary movement and wherein the locking device consists of a minimum of individual parts, which is easily operated, is silent in operation, gives reliable locking of the pivoting and rotary movement at all times, and requires no readjustment even after long periods of use and wear.

The new caster comprising a locking device for locking the pivoting and rotary movement of the wheel, wherein a pawl mounted pivotally in the caster fork cavity can, in known manner, be pressed against the wheel on the one hand and be brought into engagement with teeth on the caster holder on the other hand, is characterised, according to the basic principle of the invention, in that the pawl is constructed as an expanding member which can be expanded by an expanding toggle to lock the pivoting and rotary movement of the wheel, the expanding toggle preferably being constructed as a foot-operated lever so that locking and unlocking may be performed with the toe. The expanding element is advantageously an expanding wedge, the wedge-shaped flanks of which can be expanded by the expanding toggle to lock the pivoting and rotary movement of the wheel. Instead of a pivot locking arrangement wherein teeth on the holder or mounting connector are engaged by the pawl, any arrangement can be used where one locking member is provided on the holder or mounting connector and the locking member for co-operation therewith is mounted on the pawl.

According to a particularly advantageous development of the invention, the expanding wedge is a spring stirrup which is bent to be wedge-shaped from a leaf-spring and which is mounted at its apex in the caster fork cavity, and the bent-away leaf-spring arms can be resiliently expanded by the expanding toggle for the locking operation and be pressed resiliently on the one hand against the wheel running surface and on the other hand against the caster holder teeth.

It has been found advantageous to mount the expanding toggle in the leaf-spring stirrup more particularly in such manner that the bent leaf-like arms of the spring enclose the expanding toggle between them with a strong initial tension and have arresting zones for engagement of the expanding toggle in its locking and released position. This can be achieved very simply by arranging one of the leaf-spring arms to form a socket for a pivotal mounting for the toggle, while the other leaf-spring arm has a slot or a suitable notch as a slideway for a guide projection or the like on the expanding toggle.

The expanding toggle expanding element may be a small pivotal plate, the bottom edge of which is mounted in a socket formed by the bottom arm of the leaf-spring, and an upper projection of which engages in a guide slot which is formed in the top arm of the leaf-spring and which limits the pivoting movement of the expanding plate. The foot-operated lever provided on the pivotal expanding plate of the expanding toggle may be made in one piece with the expanding plate in the form of a pressure casting.

In order to avoid any annoying noise from the released locking device when the caster is moved, it is advantageous to mount the apex of the leaf-spring stirrup in the caster fork cavity by means of a pivot made of plastics, preferably polyamide. To obtain a strong locking action, the free end of the top arm of the leaf-spring is advantageously bent away to form an arresting strip which in order to lock the pivoting movement during the expanding operation can engage in a downwardly extending toothing on the inner ball cup of the caster holder.

Further details and features of the invention will be apparent from the following explanation of one exemplified embodiment of the invention illustrated diagrammatically in the drawings.

Figure 2:
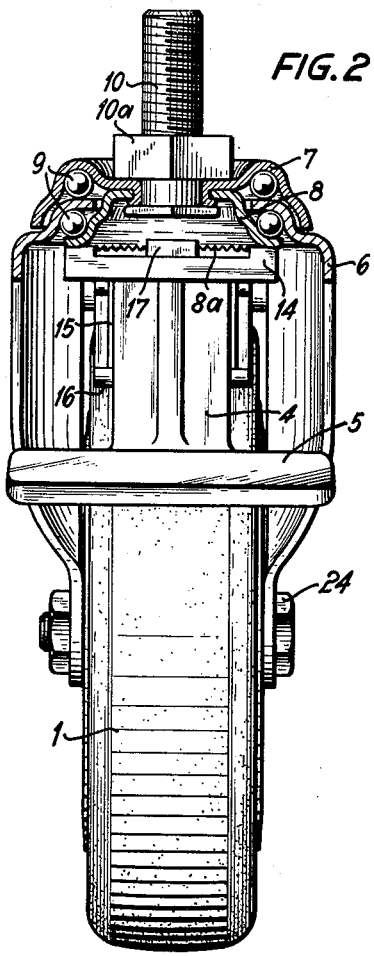
Figure 3:
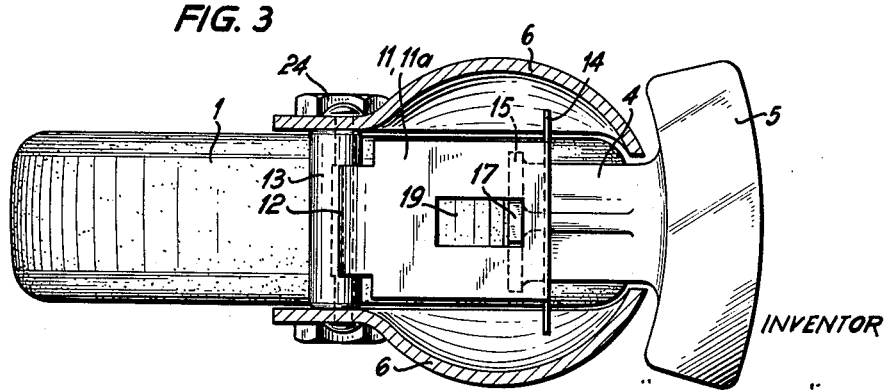

In the drawings:

FIGURE 1 is a vertical section through a caster according to the invention in the locked state, the released position being shown in broken lines, FIGURE 2 is a vertical section through the caster on the line A—A in FIGURE 1, and FIGURE 3 is a horizontal section through the caster on the line B—B in FIGURE 1.

The caster housing comprises the caster fork 6 holding the wheel 1, and the caster back bearing, which consists of the outer ball cup 7 and the inner ball cup 8 together with the balls 9. The mounting connector pin 10 is fastened on the back bearing and in this exemplified embodiment is in the form of a screwthreaded pin provided with a hexagonal portion 10a.

An expanding element 2 is mounted pivotally as a pawl to lock the pivoting and rotary movement of the wheel 1 in the cavity of the caster fork 6 and can be expanded by an expanding toggle 4. The latter is constructed as a foot-operated lever the free end of which is enclosed in a rubber shoe 5 and can be pressed down by the toe and released by lifting it into the broken-line position 5'.

In this exemplified embodiment, the expanding element 2 is an expanding wedge, the wedge-shaped flanks 2a and 2b of which can be expanded by the expanding toggle 4 to lock the pivoting and rotary movement of the wheel 1. In this exemplified embodiment the expanding wedge 2 consists of a spring stirrup 11 bent in the form of a wedge from a leaf-spring and mounted silently at its apex 12 in the cavity 3 of the caster fork 6 by means of the pivot 13 of polyamide. Such mounting provides a noiseless connection of the pawl on the fork. The bent leaf-spring arms 11a and 11b, disposed, respectively, adjacent the mounting connector 10 and the wheel 1, can be resiliently expanded by the expanding toggle for the locking operation. They then press resiliently on the one hand against the wheel surface 1a and on the other hand against the downwardly extending teeth 8a of the inner ball cup 8 of the caster holder 10. In order to ensure reliable and effective locking of the pivoting movement, the free end of the top arm 11a of the leaf-spring is bent up to form an arresting strip 14 which, during expansion, engages by way of sharp edges with the downwardly extending teeth 8a of the inner ball cup 8. As a result of the resilient expansion and pressure of the arms 11a and 11b, a reserve of power is obtained which compensates for any subsequent wear of the wheel 1 without any readjustment of the expanding system being necessary.

The expanding toggle 4 is mounted in the leaf-spring stirrup 11. Since the two arms 11a and 11b of the wedge-shaped spring stirrup 11 tend to move towards one another, the bent leaf-spring arms 11a and 11b enclose the toggle working end in the form of the pivotal plate 15 between them with initial tension. The expanding plate 15 is mounted with its bottom edge 15b in a socket 16 formed by the bottom arm 11b of the leaf-spring. At the top, the expanding plate 15 is provided with a small guide nose 17 which is movable as in a slideway in a guide slot 19 or corresponding notch provided at the top arm 11a of the leaf-spring, and guides the expanding plate 15 during its pivoting movement. The guide slot 19 limits the pivoting movement of the expanding plate 15 and thus prevents any unintentional falling out of the toggle 4 when the actuating end 5 thereof is moved up or down by means of the toe. The slot ends of the slideway 19 form arresting zones for the abutting of the toggle 4 or its pivotal expanding plate 15 in the locking position illustrated, and in the broken-line released position. Though in the unlocked position the arms are retracted, they can be and preferably are in stressed condition in both the retracted, unlocked position, and in the forced apart, locked position. The expanding toggle 4 is made in one piece as a pressure casting together with its expanding plate 15. This construction as a single piece in the form of a die casting has the advantage over sheet-metal construction in that it ensures resistance to high braking pressure stress and at the same time affords a possibility of cheaper production as is necessary for the mass parts.

What is claimed is:

1. In a caster comprising a wheel, a fork on which the wheel is rotatably mounted, said fork and a peripheral portion of the wheel disposed therein defining a cavity, a mounting connector for mounting the caster on a device to be outfitted therewith, said fork being pivotally mounted on the mounting connector, the improvement which comprises a locking device for locking the wheel with respect to rotation in the fork and with respect to pivot movement on the mounting connector, said locking device comprising:

(a) a resiliently expansible wedge-shaped pawl including a lower leaf spring arm and an upper leaf spring arm,
(b) said pawl being mounted in said cavity at its apex with its lower leaf spring end disposed adjacent the wheel and its upper leaf spring arm disposed adjacent said mounting connector,
(c) a toggle for moving the leaf spring arms between an unlocked position in which the leaf spring arms are retracted and a locked position in which said arms are forced apart with the lower leaf spring arm pressed against the wheel locking it as aforesaid,
(d) a pivot lock for locking against said pivot movement, including a first lock member mounted on said mounting connector and a second locking member mounted on said upper leaf spring arm for locking engagement with the first pivot lock member upon movement of the toggle to said locked position thereof.

2. A caster according to claim 1, said toggle having a working end for toggle action and an actuating end for selective operation of the toggle, the toggle working end being disposed between the pawl leaf spring arms remote from said apex, said working end holding the leaf spring arms apart in stressed condition in both the locked position and the unlocked position.

3. A caster according to claim 2, a socket formed in one of said leaf spring arms, a slot formed in the other of the leaf spring arms, the toggle being pivotally mounted in said socket and including a projection received in said slot, whereby the movement of the toggle in the pawl during toggle action is guided.

4. A caster according to claim 3, said socket being formed in the lower leaf spring arm, a bottom portion of the toggle working end being received in said socket providing the pivot mounting of the working end, said slot being formed in the upper leaf spring arm and the said projection of the toggle working end being an extension from the top of the toggle working end, the means defining the ends of said slot being disposed for receiving said projection in abutting relation, respectively, when the toggle working end is in the locked position and the unlocked position, whereby movement of the toggle is limited.

5. Caster according to claim 4, the lower leaf spring arm pressing resiliently against the wheel when the pawl is in the locked position.

6. A caster according to claim 5, a portion of the end of the upper leaf spring arm remote from said apex being turned upwardly providing the second locking member of said pivot lock, said first lock member of the pivot lock comprising teeth formed in said mounting connector for receiving said upturned portion of the upper leaf spring arm in locking engagement upon movement of the toggle to said locked position thereof.

7. A caster according to claim 5, the pawl being mounted at its apex in said cavity on a plastic pin, providing a noiseless mounting of the pawl in the cavity.

8. A caster according to claim 5, said toggle including the working end and the actuating end thereof being a one-piece casting.

References Cited by the Examiner

UNITED STATES PATENTS 1,633,638   6/27   Jarvis et al. _____ 16—35

FOREIGN PATENTS 60,708   4/39   Norway.

DONLEY J. STOCKING, *Primary Examiner.*